(12) United States Patent
Parker et al.

(10) Patent No.: US 7,895,015 B2
(45) Date of Patent: Feb. 22, 2011

(54) METHOD FOR MEASURING THE STRUCTURAL HEALTH OF A CIVIL STRUCTURE

(76) Inventors: David H. Parker, 3919 Deepwoods Rd., Earlysville, VA (US) 22936-9777; John M. Payne, 1523 Rutledge Ave., Charlottesville, VA (US) 22903-1417

( * ) Notice: Subject to any disclaimer, the term of this patent is extended or adjusted under 35 U.S.C. 154(b) by 194 days.

(21) Appl. No.: 12/328,210

(22) Filed: Dec. 4, 2008

(65) Prior Publication Data

US 2009/0132199 A1    May 21, 2009

(51) Int. Cl.
G01B 5/004    (2006.01)
G01B 5/14    (2006.01)

(52) U.S. Cl. .................. 702/158; 702/94; 702/95; 702/97; 702/103; 702/104; 702/150; 702/155; 702/156; 702/157; 702/159; 359/529; 359/638; 359/872; 356/614; 356/615; 356/620; 356/622; 356/4.09; 356/500; 356/459; 356/510; 356/487; 356/498; 356/141.1; 356/139.08; 250/203.2; 250/221; 250/559.33; 430/5; 430/30

(58) Field of Classification Search .................. 702/94, 702/95, 97, 103, 104, 150, 155–159; 359/224, 359/529, 638, 872; 356/614, 615, 620, 622, 356/4.09, 500, 459, 510, 487, 198, 141.1, 356/139.08; 250/203.2, 221, 559.33; 430/5, 430/30

See application file for complete search history.

(56) References Cited

U.S. PATENT DOCUMENTS

| | | | |
|---|---|---|---|
| 4,128,011 A | 12/1978 | Savage | |
| 4,409,842 A | 10/1983 | Scott | |
| 4,480,480 A | 11/1984 | Scott | |
| 4,691,446 A | 9/1987 | Pitches et al. | |
| 4,714,339 A | 12/1987 | Lau et al. | |
| 5,455,670 A | 10/1995 | Payne et al. | |
| 5,657,003 A | 8/1997 | Fuentes | |
| 5,764,360 A | 6/1998 | Meier | |
| 5,814,731 A | 9/1998 | Alexander | |
| 6,006,163 A | 12/1999 | Lichtenwalner | |
| 6,192,758 B1 | 2/2001 | Huang | |
| 6,257,064 B1 | 7/2001 | Duron | |
| 6,598,480 B2 | 7/2003 | Horiuchi | |
| 6,637,266 B1 | 10/2003 | Froom | |
| 6,718,270 B2 | 4/2004 | Horiuchi | |

(Continued)

OTHER PUBLICATIONS

Merkle et al. "Use of the Total Station for Seviceability Monitoring of Bridges With Limited Access in Missouri, USA."*

(Continued)

*Primary Examiner*—Sujoy K Kundu
(74) *Attorney, Agent, or Firm*—David H. Parker

(57) ABSTRACT

Methods are disclosed wherein the structural health of a civil structure, such as, but not limited to, a bridge or the like is measured by electronic distance measurement from a plurality of stable locations to a plurality of cardinal points on the structure in a methodical manner. By measuring the coordinates of the cardinal points, the dynamic and long-term static behavior of the structure provide an indication of the health of the structure. Analysis includes; comparison to a Finite Element Model (FEM), comparison to historical data, linearity, hysteresis, symmetry, creep, damping coefficient, and harmonic terms.

19 Claims, 5 Drawing Sheets

U.S. PATENT DOCUMENTS

| | | |
|---|---|---|
| 6,757,620 B1 | 6/2004 | Yoon |
| 6,915,217 B2 | 7/2005 | Springer |
| 6,944,550 B2 | 9/2005 | Marchetti |
| 7,101,053 B2 | 9/2006 | Parker |
| 7,194,326 B2 | 3/2007 | Cobb et al. |
| 7,199,872 B2 | 4/2007 | Van Cranenbroeck |
| 7,228,240 B2 | 6/2007 | Duron |
| 7,352,446 B2 | 4/2008 | Bridges et al. |
| 7,546,224 B2 | 6/2009 | Campbell |
| 7,580,800 B1 | 8/2009 | Winter |
| 2006/0248954 A1 | 11/2006 | Snieder |
| 2008/0006087 A1 | 1/2008 | Winter |
| 2008/0059086 A1 | 3/2008 | Duron |
| 2009/0171619 A1 | 7/2009 | Van Cranenbroeck |
| 2010/0238027 A1 | 9/2010 | Bastianini |

OTHER PUBLICATIONS

Palazzo, et al., Dynamic monitoring of structures using a robotic total station, Shaping the Change XXIII FIG Congress, Oct. 8-13, 2006, Munich, Germany.

Sokkia, SRX product literature, 2008.

National Institute of Standards and Technology, Advanced sensing technologies and advanced repair materials for the infrastructure: water systems, dams, levees, bridges, roads and highways, Mar. 2009, Gaithersburg, MD.

Schutz, Trimble engineering solution-tunnels and monitoring, white paper, 2007, Dayton, OH.

Merkle, Use of the total station for serviceability monitoring of bridges with limited access in Missouri, USA, Aug. 30-Sep. 3, 2004, 16th World conference on nondestructive testing, Montreal, Canada.

Sokkia, NET05 product literature, 2008.

Sokkia, NET1 product literature, 2007.

Point of Beginning online article, Leica geosystems web-enabled robotic total station network monitors San Pablo Dam geologic movement, Mar. 20, 2009.

GPS World, Leica geosystems total station network monitors dam movement, Mar. 19, 2009.

Leica, Leica GeoMoS, product brochure, 2009.

Leica, Leica TM30, product brochure, 2009.

Brown, et al., Monitoring of open pit mines using combined GNSS satellite receivers and robotic total stations.

James, Automatic deformation monitoring, The American Surveyor, Mar./Apr. 2006.

Leica, Leica TM30 Technical Data, product literature, 2009.

Leica, Leica TM30 Monitoring Sensor Every Half Second, product literature, 2009.

Leica, Leica Geosystems TruStories Monitoring with Leica GeoMoS, product literature.

Leica, Leica TS30 White Paper, product literature, 2009.

Leica, Leica GeoMoS Are You Interested in Movements?, product brochure.

J. M. Payne, D. Parker, and R.F. Bradley, Rangefinder with fast multiple range capability, Rev. Sci. Instrum 63 (6) Jun. 1992 p. 3311-3316.

W.T. Estler, K.L. Edmundson, G.N. Peggs, and D.H. Parker, Large-Scale Metrology—an Update, Annals of the CIRP vol. 51/2/2002, p. 587-609.

R. Hall, M.A. Goldman, David H. Parker, and John M. Payne, Measurement program for the Green Bank Telescope, SPIE vol. 3357 p. 265-276.

David H. Parker, Methods for Correcting the Group Index of Refraction at the PPM Level for Outdoor Electronic Distance Measurements, ASPE 2001 Annual Meeting, vol. 25 p. 86-87.

Amy Petticrew, Laser Rangefinder Deflection Measurements of the GBT Derrick, GBT MEMO 160, the National Radio Astronomy Observatory, Green Bank, WV.

David H. Parker, First measurements of the GBT feed arm, L0535, the National Radio Astronomy Observatory, Green Bank, WV.

Jason M. Ray, and Brian Ellison, Data taken from ZEG31020, L0485, the National Radio Astronomy Observatory, Green Bank, WV.

Collapse of the northbound U.S. Route 51 bridge spans over the Hatchie River near Covington, Tennessee Apr. 1, 1989, HAR-90-1, National Transportation Safety Board.

23 CFR Part 650 table of contents.

Collapse of U.S. 35 highway bridge Point Pleasant, West Virginia Dec. 15, 1967, HAR-71-1, National Transportation Safety Board.

NTSB determines inadequate load capacity due to design errors of gusset plates caused I-35W bridge to collapse, SB-08-53, National Transportation Safety Board.

Collapse of a suspended span of Route 95 highway bridge over Mianus River Greenwich, Connecticut Jun. 28, 1983, HAR-84-3, National Transportation Safety Board.

Collapse of New York Thruway (I-90) bridge Schoharie Creek, near Amsterdam, New York, Apr. 5, 1987, HAR-88-02, National Transportation Safety Board.

Structural Health Monitoring, product information, SAGE journal.

The 7th International Workshop on Structural Health Monitoring-2009, call for papers, Stanford University.

Los Alamos Lab: Engineering Institute: SHM Publications.

Los Alamos Structural Health Monitoring web page.

SPIE Smart Structures/NDE, Mar. 8-12, 2009 Program.

SPIE Smart Structures/NDE, Mar. 8-12, 2009 Conference 7294 Program.

SPIE Smart Structures/NDE, Mar. 8-12, 2009 Conference 7292 Program.

SPIE Smart Structures/NDE, Mar. 8-12, 2009 Conference List.

SPIE Publications Search Results for smart structures conference proceedings.

S.C. Liu and M. Tomizuka, Vision and Strategy for Sensors and Smart Structures Technology Research, Proceedings of the 4th International Workshop on Structural Health Monitoring, Stanford University, Sep. 15-17, 2003, p. 42-52.

A. Greve and W. Harth, Laser-diode distance meter in a KERN DKM 3A theodolite, Applied Optics, vol. 23, No. 17/1 Sep. 1984 p. 2982-2984.

David H. Parker, Bill Radcliff, and John Shelton, Advances in hydrostatic leveling with the NPH6, and suggestions for further enhancements, Precision Engineering 29 (2005) 367-374.

David H. Parker et al., The Feasibility of Acoustic Thermometry for Laser EDM Tempature Correction, GBT MEMO 79, the National Radio Astronomy Observatory, Green Bank, WV.

\* cited by examiner

METHOD FOR MEASURING THE STRUCTURAL HEALTH OF A CIVIL STRUCTURE

FIELD OF INVENTION

Methods are disclosed wherein the structural health of a civil structure, such as, but not limited to, a bridge or the like is determined, based on electronic distance measurements.

BACKGROUND OF THE INVENTION

Historical Overview of Structural Failures

Bridge Failures

On Aug. 1, 2007, the I-35W bridge over the Mississippi River in Minneapolis, Minn. experienced a catastrophic failure. The National Transportation Safety Board (NTSB) concluded in press release SB-08-53, included by reference herein, that the probable cause of the collapse
  was the inadequate load capacity, due to a design error by Sverdrup & Parcel and Associates, Inc., of the gusset plates at the U10 nodes, which failed under a combination of (1) substantial increases in weight of the bridge, which resulted from previous modifications and (2) the traffic and concentrated construction loads on the bridge on the day of the accident.

On Apr. 1, 1989 the US 51 bridge over the Hatchie River near Covington, Tenn. experienced a catastrophic failure. The NTSB concluded in Highway Accident Report HAR-90-1, incorporated by reference herein, that the probable cause was
  the northbound migration of the main river channel which the Tennessee Department of Transportation failed to evaluate and correct. Contributing to the severity of the accident was a lack of redundancy in the design of the bridge spans.

On Apr. 5, 1987 the 1-90 bridge over the Schoharie Creek near Amsterdam, N.Y., experienced a catastrophic failure. The NTSB concluded in Highway Accident Report HAR-88-02, incorporated by reference herein,
  that the-probable cause of the collapse of the Schoharie Creek Bridge was the failure of the New York State Thruway Authority to maintain adequate riprap around the bridge piers, which led to severe erosion in the soil beneath the spread footings. Contributing to the accident were ambiguous plans and specifications used for construction of the bridge, an inadequate NYSTA bridge inspection program, and inadequate oversight by the New York State Department of Transportation and the Federal Highway Administration. Contributing to the severity of the accident was a lack of structural redundancy in the bridge.

On Jun. 28, 1983, the I-95E bridge over the Mianus River in Greenwich Conn. experienced a catastrophic failure. The NTSB concluded in Highway Accident Report HAR-84-3, incorporated by reference herein,
  Sometime before the collapse of the suspended span, the Inside hanger in the southeast corner of the span came off of the inside end of the lower pin. This action shifted the entire weight of the southeast corner of the span onto the outside hanger. The outside hanger gradually worked its way farther outward on the pin, and over a period of time, a fatigue crack developed in the top outside end of the upper pin. The shoulder of the pin fractured off, the pin and hanger assembly failed, and the span collapsed into the river.

On Dec. 15, 1967, the US 35 bridge over the Ohio River in Point Pleasant, W.Va. experienced a catastrophic failure. The NTSB concluded in Highway Accident Report HAR-71-1, incorporated by reference herein,
  that the cause of the bridge collapse was the cleavage fracture in the lower limb of the eye of eyebar 330 at joint C13N of the north eyebar suspension chain in the Ohio side span. The fracture was caused by the development of a critical size flaw over the 40-year life of the structure as the result of the joint action of stress corrosion and corrosion fatigue.

Other Civil Structural Failures

Catastrophic failures of cranes are much more common than bridges. Investigations are conducted by the U.S. Department of Labor Occupational Safety & Health Administration (OSHA). Unfortunately, the OSHA Accident Investigation Reports are not easily accessible, but from news reports the following crane accidents occurred recently.

On Mar. 15, 2008 a crane collapsed in New York at the corner of 51st Street between Second and First Avenues. On May 30, 2008, a crane collapsed in New York at the corner of 91st Street and First Avenue. On May 31, 2008, a crane collapsed at the Black Thunder Mine in northeast Wyoming. On Jul. 18, 2008, a crane collapsed in Houston, Tex. at an oil refinery.

Railroad bridge failures occurred following flooding in Cedar Rapids on Jun. 12, 2008 and in Columbus Junction, Iowa on Jun. 24, 2008. In both cases, the bridges collapsed into the river with trains on the bridges.

On Nov. 15, 1988 the National Radio Astronomy Observatory 300-Foot Radio Telescope at Green Bank, W.Va. collapsed while observing. Prior to the collapse, it had been noted that the pointing had changed. Extensive visual inspections by maintenance mechanics climbing on the telescope earlier in the day, prompted by the pointing change, failed to identify a gusset plate which was subsequently identified as the probable cause of the collapse in a National Science Foundation Report. Without conclusive engineering data, the pointing change was dismissed as possibly due to electronic instrumentation problems.

Catastrophic failures during construction are all to frequent. For example: On Feb. 10, 2008, a stadium under construction in Fort Worth, Tex. collapsed On Oct. 27, 2008, a bridge under construction in Nampa, Id. collapsed while concrete was being poured. On Oct. 30, 2008, a parking garage under construction collapsed in Atlantic City, N.J.

Clearly there is a need in the art for additional Structural Health Monitoring measures to prevent the loss of life and property.

Preventative Measures

Bridge Inspection

In the United States, Highway bridge inspection is under the Department of Transportation Federal Highway Administration and Title 23 of the Code of Federal Regulations (CFR) Part 650 Bridges, Structures, and Hydraulics. Specifically, 23 CFR Part 650 Subpart C National Bridge Inspection Standards, the index of which is incorporated by reference, specifies the inspection frequency, inspection procedures, and reference manuals.

The American Association of State Highway and Transportation Officials (AASHTO) provides additional guidance for bridge inspections through publications such as the Manual for Bridge Evaluation. It was noted in the I-35W investigation that AASHTO guidance used by states to perform bridge inspections does not include gusset plates as a CoRe element. Moreover, it had been observed that one of the gusset plates in question had actually been observed to be bowed in the prior inspections, but was not identified as a problem.

Academic Research in Structural Health Monitoring

Structural Health Monitoring is a relatively new field of formal study. The 1st International Workshop on Structural Health Monitoring was held in 1997, with additional workshops and Proceedings published every 2 years thereafter. The 7th International Workshop on Structural Health Monitoring will be held Sep. 9-11, 2009 at Stanford University. In the call for papers, incorporated by reference herein, under the heading Sensors and Actuator Development, papers are requested for; integrated sensors, wireless sensors, "smart" sensors, fiber optics, piezoelectrics, shape memory, alloys/ polymers, MEMS sensors and micro-actuators, nano-sensors, etc.

SPIE has sponsored a number of conferences on Smart Structures. A search of the SPIE Proceedings produces 194 published Proceedings starting with Volume 0986 in 1988, a listing of which is incorporated by reference herein. SPIE will hold Smart Structures/NDE Mar. 8-12, 2009 in San Diego. The Program will include 10 sessions including 7292: Sensors and Smart Structures for Civil, Mechanical, and Aerospace Systems 7294: Nondestructive Characterization of Composite Materials, Aerospace Engineering, Civil Infrastructure, and Homeland Security III 7295: Health Monitoring of Structural and Biological Systems III the program listings of which are incorporated by reference herein, from which it will be understood that the topics of the papers are similar to the International Workshop on Structural Health Monitoring topics listed hereinabove.

Los Alamos National Laboratory has a project on Structural Health Monitoring, and has produced *A Review of Structural Health Monitoring Literature:* 1996-2001. The Web Page, Publication list, and Review is hereby incorporated by reference herein, from which it will also be understood that the topics of the papers are similar to the International Workshop on Structural Health Monitoring topics listed hereinabove.

The University of Illinois at Urbana Champaign established the Smart Structures Technology Laboratory in 2002, and has a large Graduate Program focusing on the areas of structural health monitoring, structural control, and smart sensor technologies.

Sage Journals Online publishes Structural Health Monitoring, An International Journal, with Volume 1 published in 2002. Edited by Fu-Kuo Chang of Stanford University, the web link and description is incorporated by reference herein. Yet again, the topics of the papers are similar to the International Workshop on Structural Health Monitoring topics listed hereinabove.

A review of the aforementioned bibliographic sources presents one with a clear understanding of the prior art in the academic community at the time of the invention. In particular, the measurement techniques tend to concentrate on either localized strain measurements, vibrational analysis, localized movements of such things as joints, or wireless sensor technology.

The concentration of research is possibly due in part to the emphasis of the National Science Foundation by the Strategic Civil Infrastructure Systems Research Program, developed in 1993, as described by Liu and Tomizuka in *Vision and Strategy for Sensors and Smart Structures Technology Research*, incorporated by reference herein.

Shortcomings of the Prior Art

Vibrational analysis inherently integrates all components of the structure into a few vibrational measurements, e.g., a shift in loading anywhere in the structure produces a change in vibrational modes. The problem is that analysis of the data is very complex, and may not point to suspect areas for follow-up human inspection. For example, a change in the damping coefficient may be due to friction of a bearing, loose joints, or snow on the structure.

Strain measurements are localized measurements and therefore require a large number of transducers to map a civil structure. For example, typical strain gages are less than 1 inch in length. Moreover, bonding of the strain transducers to the structural elements may make retrofitting an existing structure, or replacement of embedded transducers, difficult. The incremental cost for additional measurement points is approximately linear with the number of points. The most significant problem is that analysis requires extrapolation of the localized measurements of a large number of transducers to model the structure.

Need Fulfilled by the Invention

Direct measurements of the coordinates of a structure at cardinal points which provide unambiguous indications as to the health of the structure are needed. This can be achieved by incorporating advances in Electronic Distance Measurement (EDM) to Structural Health Monitoring. A significant advantage is that the large capital investment for instrumentation and software is a one-time expense which can be shared over hundreds of structures, while the incremental cost for additional cardinal points on the structure is small.

The only known proposal of EDM for Structural Health Monitoring is described in *Measurement Program for the Green Bank Telescope*, Hall et al, SPIE Conference on Advanced Technology MMW, Radio, and Terahertz Telescopes, Kona, Hi., March 1998, SPIE Vol. 3357, which is incorporated by reference herein. This proposal was not reduced to practice, and was limited to the specific case of a radio telescope rotating in azimuth and elevation.

As illustrated by the recited case histories, there is a long-felt but unresolved need to prevent civil structural failures in order to protect life and property. It would therefore be desirable and advantageous to address the problems of Structural Health Monitoring and to obviate other prior art shortcomings by bringing the advantages afforded by modern Electronic Distance Measurement instrumentation to the problem.

BRIEF SUMMARY OF THE INVENTION

Electronic Distance Measurement is used for Structural Health Measurement of civil structures. An architecture for making measurements and converting to (x,y,z) coordinates is described. Data analysis examples are described for a bridge, including applications to historic bridge collapses.

DETAILED DESCRIPTION OF THE INVENTION

Electronic Distance Measurement

Figure 1:
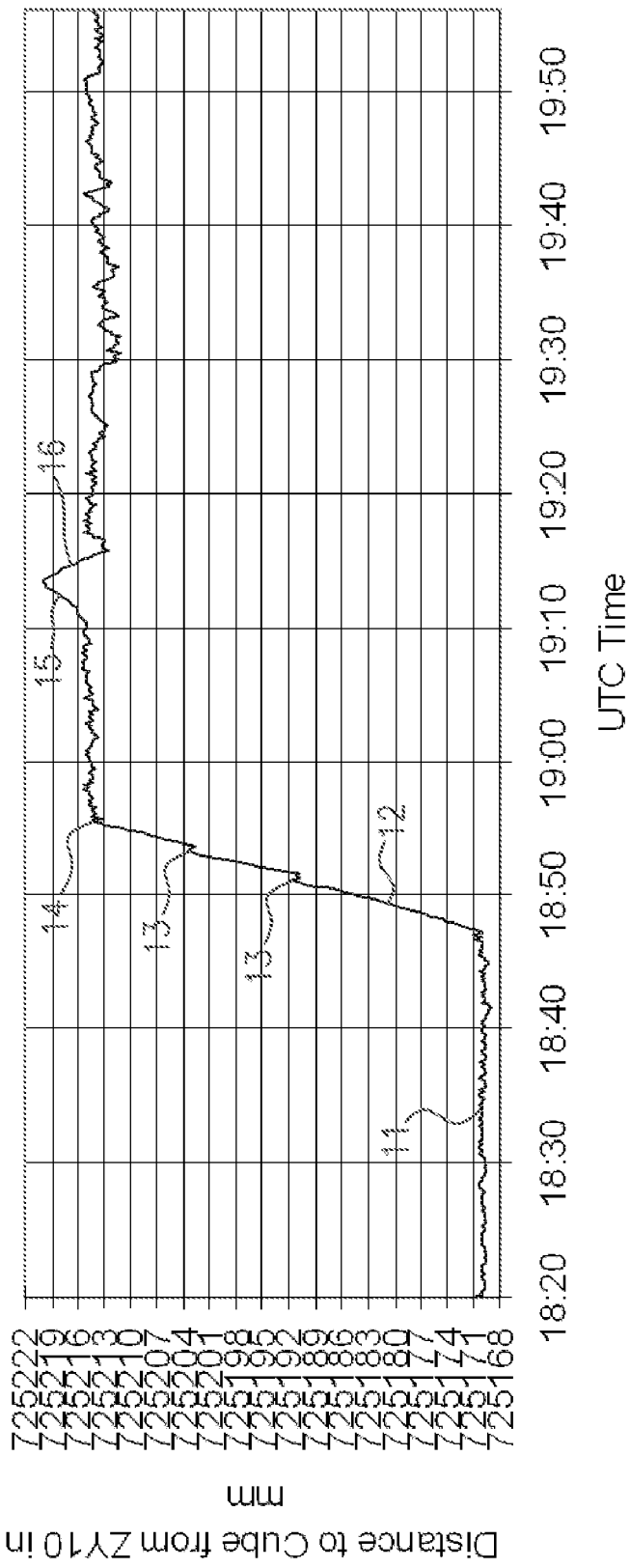
FIG. 1 is a plot of prior art EDM measurements of a crane deflections.

The most common surveying instrument used by Civil and Structural engineers is the total station, which is a modern version of the theodolite. The earliest known version was constructed by Greve and Harth as reported in *Laser-diode distance meter in a Kern DKM 3A theodolite*, Applied Optics Vol. 23, No. 17/1, September 1984, incorporated by reference herein.

The total station incorporates electronic distance measurement with measurement of two angles. Typical uncertainty is around 1 arc second for angles and 3 mm for distance under ideal conditions. Measurement are made by a surveyor sighting through a telescope and pressing a button to initiate a distance measurement, which typically takes several seconds to complete. For reasons that will be discussed in detail hereinbelow, the uncertainty is too large for structural health monitoring of stiff structures.

Electronic Distance Measurement has progressed at a steady pace, which now makes the technology attractive for Structural Health Monitoring applications. Moreover, commercial instruments are available from Faro Technologies, Inc., Lake Mary, Fla. and Leica AG, Heerbrugg, Switzerland, that could (and most surely will) be adapted for the purpose.

Pitches et al. disclosed a Three-Dimensional Position Measuring Apparatus in U.S. Pat. No. 4,691,446 in 1987, incorporated by reference herein, which comprises a plurality of laser rangefinders measuring the distances to a plurality of corner cube reflectors. By trilateration, the coordinate of a target point may be determined. However, the '446 patent does not disclose the details of the laser rangefinders or coordinate system and it is not directed to Structural Health Monitoring.

U.S. Pat. No. 4,714,339 to Lau and Hocken in 1987, incorporated by reference herein, disclosed *Three and Five Axis Laser Tracking Systems* which comprised a moving mirror and a laser interferometer. It will be understood by those skilled in the art that a laser interferometer inherently measures the phase of a light signal and is thus limited to integrating distances from a starting point, i.e., the mirror can not switch the interferometer between a plurality of points.

In order to switch between a plurality of points, it is necessary to use an absolute distance measurement, or incorporate a priori knowledge of the approximate distance to a target within the ambiguity of the distance measurement. Payne et al. disclosed such a *Rangefinder with Fast Multiple Range Capability* in Rev. Sci. Instrum. 63(6), June 1992, and U.S. Pat. No. 5,455,670 *Optical Electronic Distance Measuring Apparatus with Movable Mirror* in 1995, both of which are incorporated by reference herein. The modulation of 1500 MHz results in an ambiguity of approximately 100 mm. For a quasi static structure, the location of a target will normally be known within an uncertainty of 50 mm, and thus there was no need to provide additional capabilities to resolve the uncertainty.

Note that the 20 custom designed and built instruments, the Model PSH97, did not incorporate tracking capability, since it was designed to switch between a plurality of quasi static targets. Pointing was achieved based on the a priori target coordinate, a finite element model of the structure, and instrument coordinate and orientation with minor adjustments made based on signal strength peaking by searching around the calculated instrument azimuth and elevation encoder readings.

The PSH97 instrument incorporates a six degrees of freedom Kelvin mount, which in combination with laboratory calibration of the instrument and field calibration of the mounting monuments provide for instrument replacement wherein a specific instrument placed on a specific monument can point to a coordinate by dead reckoning by loading a few calibration parameters into the control software.

In order to facilitate strong baseline measurements between instruments, the mirror mounting incorporates a retroreflector on the back side. A measurement between instruments is conducted by a first instrument turning its retroreflector toward a second instrument, and the second instrument measuring the distance to the first instrument. By correcting for the retroreflector offset and mounting, the distance between instruments is measured. The same distance is measured by the first instrument to the second instrument in the same manner. It will be recognized that instruments in a plane cannot determine the z coordinate by measuring between instruments. This is accomplished by a hydrostatic level as described in *Advances in hydrostatic leveling with the NPH6, and suggestions for further enhancements*, Parker, Radcliff, and Shelton, Precision Engineering, 29 (2005) 367-374, incorporated by reference herein.

U.S. Pat. No. 5,764,360 to Meier in 1998, incorporated by reference herein, discloses *Electro-Optical Measuring Device for Absolute Distances* which comprises the combination of absolute distance measurement with tracking.

U.S. Pat. No. 7,352,446 to Bridges and Hoffer in 2008, incorporated by reference herein, discloses an *Absolute Distance Meter That Measures a Moving Retroreflector*, which combines absolute distance while moving and tracking.

Other than the PSH97, there are no other known EDM instruments that incorporate a Kelvin mount or integral retroreflector to facilitate measurements between cooperating instruments. Moreover, the '670 patent teaches the use of plural instruments measuring plural targets although it has yet to be fully realized for the intended purpose on the Green Bank Telescope, i.e., the '670 patent has not been fully reduced to practice at this time.

Large-Scale Metrology

An excellent review of Large Scale Metrology can be found in *Large-Scale Metrology—An Update*, Estler, Edmundson, Peggs, and Parker, Annals of the CIRP, Vol. 51/2/2002, which is incorporated by reference herein. Section 2.4 discusses turbulence, whereby the noise of an angle measurement to a target at a distance L increases roughly as $L^{3/2}$. Particularly for long outdoor measurements, such as for a civil structure, this is a significant limitation for single tracking instruments, such as the '339, '360, and '446 instruments. This is explained in detail in U.S. Pat. No. 7,101,053 Multidirectional Retroreflectors to Parker in 2006, incorporated by reference herein, at column 3 line 60 through column 4 line 20.

The '053 patent makes the argument that the best method to achieve strong measurements is by using a plurality of distance measurements and solving for a coordinate by multilateration, i.e., ignore the angle measurements in the adjustment. Moreover, '053 teaches a retroreflector architecture to eliminate the Abbe error for such a measurement.

Multilateration is well known in the art, and software such as STAR*NET V6 is available from Starplus Software, Oakland, Calif., to perform least squares adjustments.

It will be recognized by those skilled in the art that the speed of light through the atmosphere is dependent on temperature, humidity, and pressure; where temperature is the primary uncertainty. Correction methods are addressed in report GBT Archive L0680 *Methods for Correcting the Group Index of Refraction at the PPM Level for Outdoor Electronic Distance Measurements*, which is incorporated by reference. In addition to measuring temperature, humidity, and pressure and calculating the index of refraction, methods are disclosed to use fixed bench marks as refractometers and acoustic thermometry to measure the speed of sound which is also dependent on temperature. Acoustic thermometry is described in GBT Memo 79 *The Feasibility of Acoustic Thermometry for Laser EDM Temperature Correction*, Parker, D. H., et. al. (7-92), which is incorporated by reference herein.

Example Electronic Distance Measurements for Large-Scale Metrology

Example measurements made with the PSH97 instrument described hereinabove will illustrate the utility of EDM for Structural Health Monitoring.

GBT MEMO 160 *Laser Rangefinder Deflection Measurements of the GBT Derrick*, incorporated by reference herein, reports on measurements of the deflection of a derrick crane while lifting a 89 500 pound load from a distance of approximately 725 m. One of the figures is reproduced herein as FIG. 1. Note that prior to the time around 18:50 11 the load was hanging freely near the ground with the boom at approximately 45 degrees to the horizon. Starting around 18:50 12 the boom was raised with pauses to adjust the whip line 13 which slightly adjusted the angle of the load, and thus the center of gravity. When the boom reached approximately 75 degrees 14, the boom was swung right 15, and then the boom was lowered slightly 16.

Note that as the boom was raised 12-14, the derrick moved approximately 45 mm in the direction of the instrument due to the reduction in the moment on the 180 foot tall tower to which the derrick was mounted. Also note that other than the adjustments to the whip line 13, the movement of the tower 12-14 was a smooth function.

Figure 2:
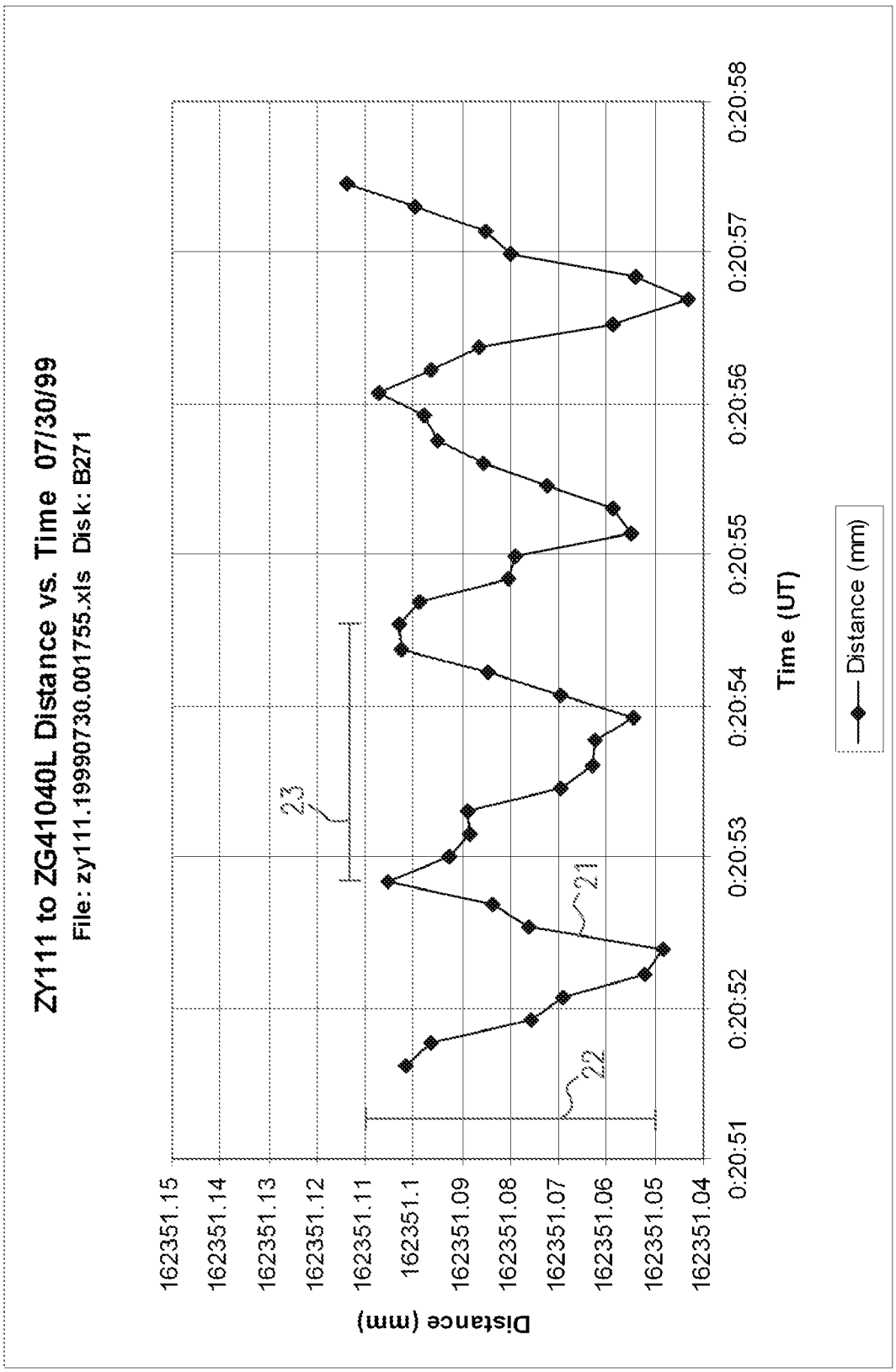
FIG. 2 is a plot of prior art EDM measurements of natural frequency vibrations.

GBT Archive L0535, incorporated by reference herein, reports on measurements of a point on the Green Bank Telescope (GBT) which shows measurements from approximately 162 m. A figure is reproduced herein as FIG. 2 from which one will recognize that natural frequency vibrations 21 of approximately 60 microns 22 with a period of approximately 1.5 s 23 are clearly detected.

Figure 3:
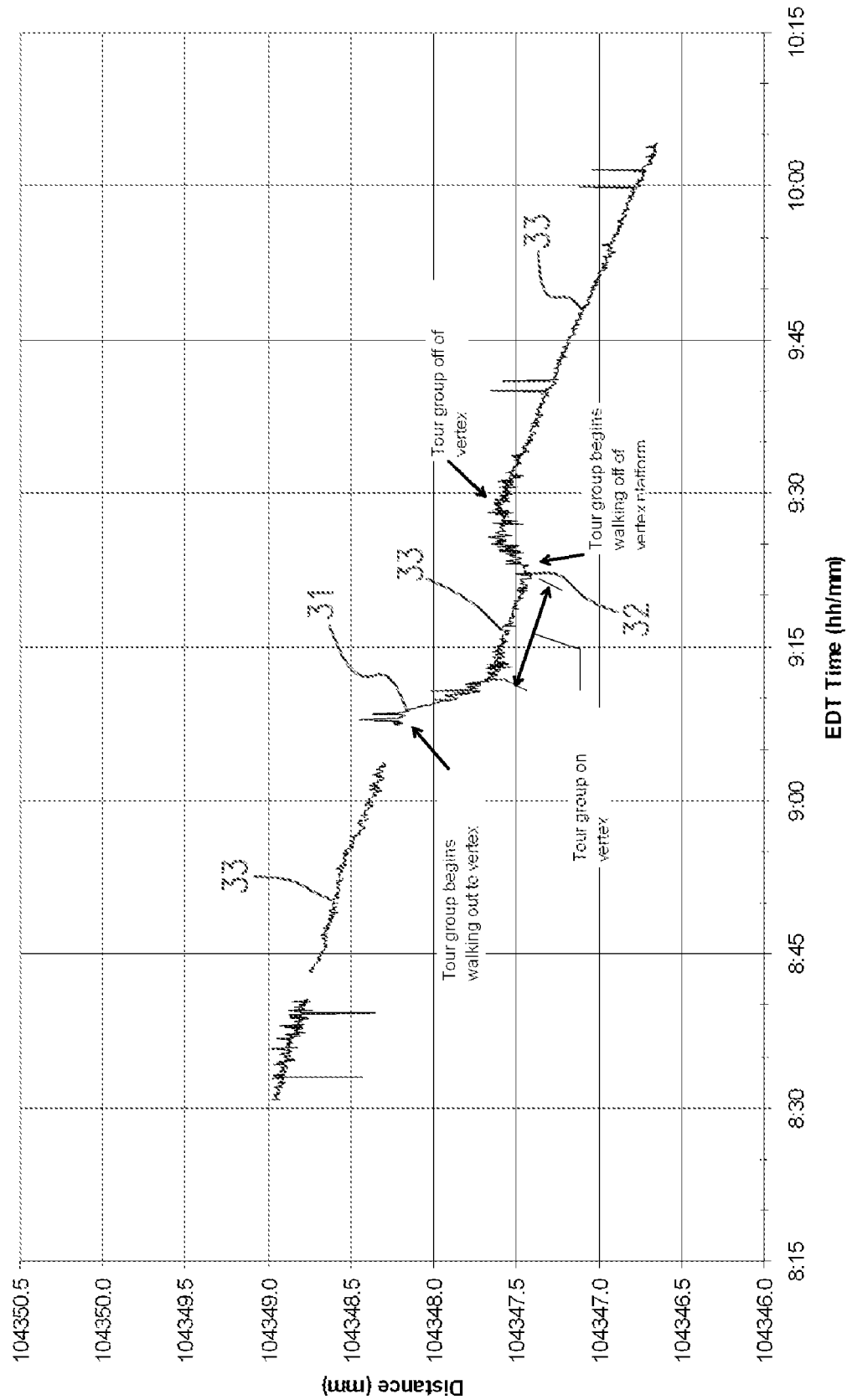
FIG. 3 is a plot of prior art EDM measurements of thermal drift and deflections produced by a tour group walking on a structure.

GBT Archive L0485, incorporated by reference herein, reports on measurements of a point on the GBT from approximately 84 meters. A figure is reproduced herein as FIG. 3 which shows the deflection of the telescope structure near the vertex as a tour group walked approximately 50 m-out to the vertex starting 31 around 9:08, and starting to return 32 around 9:18. It will also be recognized that thermal changes 33 are also detectable.

These examples clearly show that EDM is capable of measuring distances, with a group refractive index correction, at around the 1 part per million range for absolute distance. Moreover, dynamic measurements of differential changes in distance operate in the noise level of around 10 microns for outdoor measurements. It will be recognized that signal processing techniques may be used to reduce the noise for repeatable motions such as vibrational analysis, and the noise level will be lower for night measurements.

Applications of Electronic Distance Measurement to Structural Health Monitoring

Consider a civil structure such as, but not limited to, a bridge or the like. Permanent retroreflectors, or permanent mounts for temporary retroreflectors, can easily and economically be installed at a plurality of locations of interest on the structure. A plurality of fixed bench mark locations fixed in the earth adjacent to the bridge provide a local reference coordinate system which could also be fixed to a global coordinate system, such as the National Geodetic Survey (NGS), by differential GPS observations in conjunction with reference NGS bench mark observations.

For the purpose of this discussion, assume any point on the bridge visible from 3 or more widely spaced locations on the ground can be known, by automated measurements, to an absolute coordinate with an uncertainty of around 100 microns, and the dynamic location can be know to an uncertainty of around 10 microns at a frequency of several Hertz. It will be understood that the absolute coordinates will be for the entire life of the structure and reference coordinate system.

Application to Recited Cases

Given such a capability, a number of applications will be recognized by those skilled in the art. For example, in the case of the I-35W bridge described hereinabove, a finite element model of the bridge would have predicted the deflections for the previous modifications to the bridge. By knowing the actual coordinates of points before and after the modifications, it would have been noted that the model was in error, i.e., the model of the joints was in error. At the time of the collapse, measurements before the contractor started and as work progressed would have identified that concentrated loading of material on the bridge was a problem.

In the case of the US 51 bridge described hereinabove, movement of the bridge due to migration of the main river channel would have been detected as a long term drift in coordinates of the bridge, changes in the deflections under load due to weakness in the foundations, or asymmetry in the deflections due to differences in the foundation of different columns.

In the case of the I-90 bridge described hereinabove, changes in the coordinates of the bridge or asymmetric deflections over solid vs weak foundations would have identified a problem.

In the case of the I-95E bridge described hereinabove, changes in the coordinates of the bridge would have identified the problem at the outset.

In the case of the US 35 bridge described hereinabove, it is not clear if the corrosion resulted in changes in coordinates of points leading up to the single point catastrophic failure. A nonlinear response could be detected by heavily loading the structure by closing the bridge and placing tanks on the bridge which could be filled with metered water to calculate the dead load while observing the deflections for nonlinearities.

In the Other Civil Structural Failures recited hereinabove, there are insufficient details from news reports to know exactly how the failures occurred. Unfortunately, such failures are so commonplace that extensive investigations and official reports are not published. However, it is likely that some could have been prevented by Structural Health Monitoring, including coordinate measurements.

Other Applications

New bridges and buildings undergo extensive Finite Element Model (FEM) analysis in the design phase. However, a number of assumptions are made just as the assumption was made that the gusset plates in the I-35W bridge were more than adequate and were not checked by calculation, a modern finite element model may approximate the joint as a pin connection and not bother with the details of the gusset.

Finite Element Models can predict deflections and natural frequency modes of a structure in stages as it is being built. By actually measuring the deflections and vibrational modes as the structure is built, errors in the model can be detected when the predicted coordinates do not match the experimental data. Moreover, by providing the designer with feedback, confidence will be gained in the design. It will be understood that movements and deflections are resolved into three axes (x,y,z).

It will be recognized that in the absence of a Finite Element Model, there are general characteristics indicative of a healthy structure. Deviations from these general characteristics will be recognized by those skilled in the art as a harbinger to a structural health problem. For example:

1. Deflections should be linear, i.e., they should follow Hooke's law $f=kx$ where f is force, k is a spring constant, and x is the displacement. For example, the deflection of a bridge deck under a 2 ton load should be twice the deflection under a 1 ton load. The deflections of a tower crane should be linear as the load is translated out the arm.
2. Cracks are one source of nonlinearity that will be identifiable. For example, a crack is stiff in compression and weak in tension. Loading that cycles a cracked element between tension and compression shows strong nonlinearities in the movements of points on the structure. For example, a tower crane with no load typically has a net moment produced by the counterweight. This results in elements of the tower on one side being in tension and elements on the opposite side being in compression. By rotating in azimuth, the loads reverse. A structurally sound tower should produce symmetric deflections as a function of azimuth.
3. Elements operating near their elastic limit will produce nonlinearities in the movements of points.
4. There should be no hysteresis, e.g., a structure should return to the initial position after a load is removed. By measuring a plurality of points, such things as slipping joints are detectable.
5. Movements should be a smooth function. For example, as the temperature goes through a diurnal cycle, a bridge will expand and contract. Typically one end is supported on a bearing to accommodate these movements. If the bearing is not functioning properly, excessive forces may develop until they reach a point of producing slip. This will be easily detectable by accurate coordinate measurements.
6. Plots of the deflections in (x,y,z) of a cardinal point as a vehicle travels over a bridge at uniform velocity should be capable of being expressed as the first few harmonics in a harmonic series, i.e., there should not be any sharp bumps in the plots, and there should be no hysteresis.
7. Long-term creep should be well understood, such as concrete curing or seasonal moisture absorption.
8. Changes in the damping coefficient, or Q, of the structure should be well understood, such as changes in weight due to rain.

It will also be recognized that in the absence of a Finite Element Model, symmetry of a bridge may be exploited in the analysis. For example, most bridges have left-right symmetry about the direction of traffic and one would expect the deflections of a test load on the left side to produce symmetric deflections for the same load applied to the right side. There can also be symmetry between ends, spans, support columns, and even between other bridges of similar design. Prestress or post tensioned tendon failure could be detected by asymmetry. Internal corrosion of concrete embedded rebar could be detectable particularly as a long term drift over years.

It is often the case that the highest loads may be experienced during construction. For example, a load may be cantilevered out producing loading on columns that they will not experience under normal operating conditions. By measuring a plurality of points routinely, problem areas can be detected when experimental data does not match predictions, or something creeps.

The integrity of a bridge may come into question as a result of an accident, flood, earthquake, etc. For example, an accident producing a fire on, or under, a bridge my weaken structural members. Bridges over waterways are often hit by ships, flood debris, ice, etc. Simply by knowing that cardinal points on the bridge are not within the seasonal limits could quickly identify problem areas.

Implementation of a Structural Health

Monitoring Program for Bridges

Figure 4:
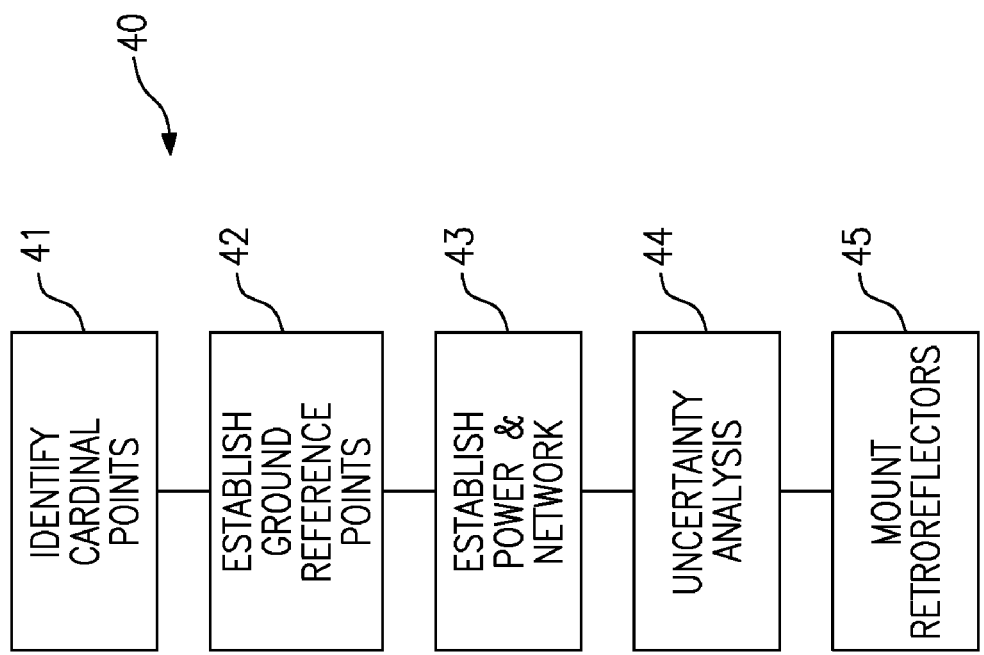
FIG. 4 is a flow chart of the structure preparation for the preferred embodiment.
Figure 5:
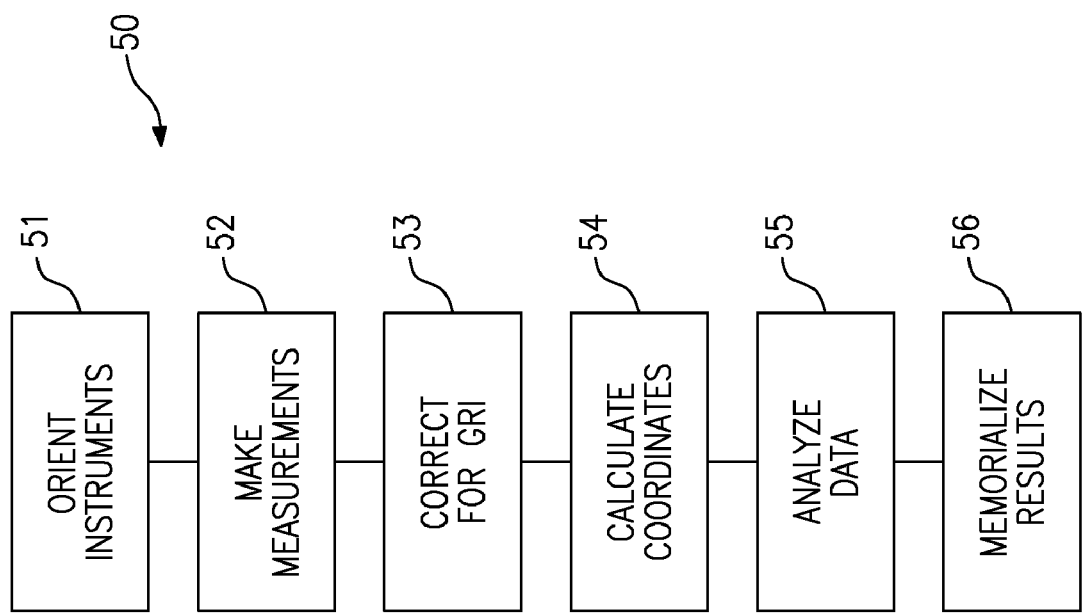
FIG. 5 is a flow chart of the measurement and analysis for the preferred embodiment.

A Structural Health Monitoring Program can be divided into two stages. In the first stage 40, as shown in FIG. 4, the structure is equipped for measurement with permanent fixturing. In the second stage 50, as shown in FIG. 5, the actual measurements are repeated over time, typically using portable instruments.

Stage One

In the US, bridges are typically inspected by State Highway Departments or Railroad owners. Engineers for the responsible agency or owner need to identify cardinal points 41 on the structure that serve as indicators of the health of the structure. These cardinal points can be added on for existing structures or identified and built into new construction at the design phase.

Stable reference points on the ground need to be established 42 to serve as a reference coordinate system as well as instrument mounting locations. Ideally, electricity and network communications 43 will be available at the instrument locations.

An uncertainty analysis 44 needs to be conducted to determine the optimum geometry for the instrument locations.

Retroreflectors need to be mounted on the structure 45. Due to the relatively low cost and robust design of retroreflectors, they can be left on the structure permanently although calibration should be taken into account so that the cardinal point can be recovered if the retroreflector require replacement over the life of the structure. Multidirectional retroreflectors, as described in '053 hereinabove, are suggested in order to avoid the Abbe errors.

A conventional survey at the 3 mm uncertainty level is conducted 46 to find the approximate coordinates for instrument pointing.

Stage Two

A means for orienting instruments 51 on a known bench mark is required in order to point the instrument to the approximate coordinates. For example, a Kelvin mount, as used with the PSH97, or by initially tracking a retroreflector to reference marks to orient the instruments.

Measurements will be taken to all points and ideally between cooperating instruments 52 to strengthen the baselines. Corrections for temperature, humidity, and pressure, will be made 53 by weather instruments (including possibly acoustic thermometry) or by refractometer measurements based on known baselines. The data will be reduced by multilateration calculations to produce the most accurate coordinate measurements 54.

It will be understood that the measurements can be under static conditions or dynamic load conditions, depending on the nature of the analysis being conducted. The data will be analyzed 55 and maintained in the permanent records 56 of the agency or owner for monitoring changes over the life of the structure.

Once the cardinal points and bench marks are established the first time, the process can be repeated by a two person crew in a few hours. For example, a State Highway Department or Railroad can have a traveling crew that could conduct the field survey for several bridges per day. For a more detailed study, or critical structure, the instruments can be operated over a long period of time or be permanent installations.

Other Applications

It will be understood by those skilled in the art that the spirit of the methods are not limited to a bridge. For example, after the Sep. 11, 2001 terrorist attack in New York, the structural integrity of buildings in proximity to the World Trade Center were in question. By measuring cardinal points on buildings with respect to a local reference coordinate system before an incident, post incident measurements could assure confidence in the integrity of a building.

Had the World Trade Center Towers been equipped with EDM instrumentation on 9/11, measurements could have provided warning that the building was creeping. For example, the structure should have been rising due to the morning sun warming the structure. The coefficient of expansion for steel is around 11 parts per million/C°. A point 150 meters (approximately 500 feet) up the structure would rise approximately 1.6 mm/C°. Points above the fire would rise even more. By measuring the differential between the top and mid section of the structure, it would have raised concers to see the mid section rising, while the top was creeping down instead of up.

Buildings are also susceptible to such things as subsidence due to; foundation faults, water main breaks, tunneling for utilities or commuter rail system construction, earthquakes, hurricanes, or the like. Building integrity can also be called into question by fires, explosions, raming, renovations, etc.

It would be useful to monitor the health of cranes, or structures in amusement parks, such as roller coasters—in particular when conducting engineered lifts near the design capacity of the crane, or in crowded locations which would endanger life or property in the event of an accident.

Modern civil structures undergo extensive Finite Element Model analysis in the design phase. A number of assumptions must be made in order to simplify the analysis. In the aircraft industry, the models are checked against experimental data to confirm the safety of an aircraft design. In the case of one-of-a kind civil structures, the FEMs are hardly ever checked against the as-built structure. These methods could provide feedback to the FEMs and identify errors in the models.

It will also be recognized that the architecture described could be used indoors, similar to U.S. Pat. No. 7,194,326, *Method and Systems for Large-Scale Airframe Assembly* to Cobb et al., incorporated by reference herein, where higher accuracy is desirable. The architecture could be used outdoors for such large-scale applications as ship building and repair.

What is claimed is:

1. A method for determining structural health of a bridge comprising:
    (a) measuring a plurality of cardinal points fixed to said bridge from a plurality of locations, wherein
        at least one retroreflector is attached to each of said cardinal points, a plurality of electronic distance measurement instruments are mounted in a stable reference coordinate system, and a central processor coordinates said plurality of electronic distance measurement instruments;
    (b) measuring at least; a first range from a first electronic distance measurement instrument to a first cardinal point, a second range from a second electronic distance measurement instrument to said first cardinal point, and a third range from a third electronic distance measurement instrument to said first cardinal point, wherein
        said first electronic distance measurement instrument is at a first location,
        said second electronic distance measurement instrument is at a second location,
        said third electronic distance measurement instrument is at a third location, and wherein
        said first location, said second location, and said third location are three different locations;
    (c) storing at least said first, second, and third ranges;
    (d) computing a first three dimensional coordinate of said first cardinal point, in said stable reference coordinate system, based at least in part on said first, second, and third ranges;
    (e) determining at least a first structural health parameter of said bridge based at least in part on said first three dimensional coordinate;
    (f) storing said first structural health parameter.

2. The method of claim 1 further comprising;
    (a) measuring at least; a fourth range from said first electronic distance measurement instrument to a second cardinal point, a fifth range from said second electronic distance measurement instrument to said second cardinal point, and a sixth range from said third electronic distance measurement instrument to said second cardinal point;
    (b) storing at least said fourth, fifth, and sixth ranges;
    (c) computing a second three dimensional coordinate of said second cardinal point, in said stable reference coordinate system, based at least in part on said fourth, fifth, and sixth ranges;

(d) determining at least a second structural health parameter of said bridge based at least in part on said second three dimensional coordinate;
(e) storing said second structural health parameter.

3. The method of claim 1 further comprising;
(a) measuring at least; a seventh range from a fourth electronic distance measurement instrument to a third cardinal point, an eighth range from a fifth electronic distance measurement instrument to said third cardinal point, and a ninth range from a sixth electronic distance measurement instrument to said third cardinal point, wherein
said fourth electronic distance measurement instrument is at a fourth location,
said fifth electronic distance measurement instrument is at a fifth location,
said sixth electronic distance measurement instrument is at a sixth location, and wherein
said fourth location, said fifth location, and said sixth location are three different locations;
(b) storing at least said seventh, eighth, and ninth ranges;
(c) computing a third three dimensional coordinate of said third cardinal point, in said stable reference coordinate system, based at least in part on said seventh, eighth, and ninth ranges;
(d) determining at least a third structural health parameter of said bridge based at least in part on said third three dimensional coordinate;
(e) storing said third structural health parameter.

4. The method of claim 2 further comprising;
(a) determining at least a fourth structural health parameter of said bridge based at least in part on said first three dimensional coordinate and said second three dimensional coordinate;
(b) storing said fourth structural health parameter.

5. The method of claim 3 further comprising;
(a) determining at least a fifth structural health parameter of said bridge based at least in part on said first three dimensional coordinate and said third three dimensional coordinate;
(b) storing said fifth structural health parameter.

6. The method of claim 1 further comprising;
(a) performing steps a-f of claim 1 at a first epoch in time;
(b) performing steps a-f of claim 1 at a second epoch in time;
(c) determining at least a sixth structural health parameter of said bridge based at least in part on said first epoch in time and said second epoch in time;
(d) storing said sixth structural health parameter.

7. The method of claim 6 wherein the time between said first and second epochs in time is greater than one day.

8. The method of claim 6 wherein the time between said first and second epochs in time is less than one day.

9. The method of claim 6 wherein the time between said first and second epochs in time is less than ½ the period of the fundamental frequency of the natural vibrations of said bridge.

10. The method of claim 6 wherein at least one parameter affecting the bridge is changed between said first and second epochs in time.

11. The method of claim 1 further comprising;
(a) measuring at least a tenth range from said first electronic distance measurement instrument to said second electronic distance measurement instrument;
(b) storing at least said tenth range;
(c) computing a fourth three dimensional coordinate of said first cardinal point, in said stable reference coordinate system, based at least in part on said first, second, third, and tenth ranges.

12. The method of claim 1 wherein the absolute uncertainty of said first, second, and third ranges is less than 1 mm.

13. The method of claim 1 wherein the absolute uncertainty of said first, second, and third ranges is less than 0.1 mm.

14. The method of claim 6 wherein the relative uncertainty of said first, second, and third ranges, between said first and second epochs in time, is less than 1 mm.

15. The method of claim 6 wherein the relative uncertainty of said first, second, and third ranges, between said first and second epochs in time, is less than 0.1 mm.

16. The method of claim 6 wherein the relative uncertainty of said first, second, and third ranges, between said first and second epochs in time, is less than 0.01 mm.

17. The method of claim 1, wherein a first multidirectional retroreflector is attached to said first cardinal point.

18. A method for determining structural health of a building comprising:
(a) measuring a plurality of cardinal points fixed to said building from a plurality of locations, wherein
at least one retroreflector is attached to each of said cardinal points, a plurality of electronic distance measurement instruments are mounted in a stable reference coordinate system, and a central processor coordinates said plurality of electronic distance measurement instruments;
(b) measuring at least; a first range from a first electronic distance measurement instrument to a first cardinal point, a second range from a second electronic distance measurement instrument to said first cardinal point, and a third range from a third electronic distance measurement instrument to said first cardinal point, wherein
said first electronic distance measurement instrument is at a first location,
said second electronic distance measurement instrument is at a second location,
said third electronic distance measurement instrument is at a third location, and wherein
said first location, said second location, and said third location are three different locations;
(c) storing at least said first, second, and third ranges;
(d) computing a first three dimensional coordinate of said first cardinal point, in said stable reference coordinate system, based at least in part on said first, second, and third ranges;
(e) determining at least a first structural health parameter of said building based at least in part on said first three dimensional coordinate;
(f) storing said first structural health parameter.

19. A method for determining structural health of a crane comprising:
(a) measuring a plurality of cardinal points fixed to said crane from a plurality of locations, wherein at least one retroreflector is attached to each of said cardinal points, a plurality of electronic distance measurement instruments are mounted in a stable reference coordinate system, and a central processor coordinates said plurality of electronic distance measurement instruments;
(b) measuring at least; a first range from a first electronic distance measurement instrument to a first cardinal point, a second range from a second electronic distance measurement instrument to said first cardinal point, and a third range from a third electronic distance measurement instrument to said first cardinal point, wherein said first electronic distance measurement instrument is at a first location, said second electronic distance measurement instrument is at a second location, said third electronic distance measurement instrument is at a third location, and wherein said first location, said second location, and said third location are three different locations;

(c) storing at least said first, second, and third ranges;
(d) computing a first three dimensional coordinate of said first cardinal point, in said stable reference coordinate system, based at least in part on said first, second, and third ranges;
(e) determining at least a first structural health parameter of said crane based at least in part on said first three dimensional coordinate;
(f) storing said first structural health parameter.

* * * * *